United States Patent [19]
Eanzel

[11] 3,843,579
[45] Oct. 22, 1974

[54] WATER IN OIL FLUOROPOLYMER EMULSION CONTAINING HYDROCARBON OR HALOGENATED HYDROCARBON SOLVENT

[75] Inventor: Albert Robert Eanzel, Wilmington, Del.

[73] Assignee: E. I. du Pont de Nemours and Company, Wilmington, Del.

[22] Filed: Jan. 31, 1973

[21] Appl. No.: 328,383

[52] U.S. Cl.. 260/29.6 F, 117/161 UZ, 260/29.6 H, 260/29.6 RW, 260/29.6 MH
[51] Int. Cl. ............................................. C08f 45/24
[58] Field of Search ................ 260/29.6 F, 29.6 RW

[56] References Cited
UNITED STATES PATENTS
3,446,761   5/1969   Antonelli et al ................ 260/29.6 F
3,668,163   6/1972   Rapp ............................. 260/29.6 F Primary Examiner—Harold O. Anderson

[57] ABSTRACT

A water in oil emulsion which comprises a major amount of a halogenated solvent such as trichloroethylene or tetrachloroethylene, and water, a polyfluoroalkyl containing composition having oil and water repellent properties and a minor amount of an emulsion-stabilizing copolymer derived from ethylene and an aminoalkyl acrylate or methacrylate is effective for treating textiles and paper to provide oil and water repellency.

5 Claims, No Drawings

WATER IN OIL FLUOROPOLYMER EMULSION CONTAINING HYDROCARBON OR HALOGENATED HYDROCARBON SOLVENT

BACKGROUND OF THE INVENTION

1. Field of the Invention

This invention relates to fluoropolymer compositions for application to textiles and paper to confer oil and water repellency, and more particularly is directed to compositions comprising a major amount of halogenated solvent, some water, a polyfluoroalkyl repellent and a minor amount of an emulsion-stabilizing copolymer.

2. Prior Art

It is well known to apply fluorinated oil and water repellents to textiles and paper by means of aqueous dispersions of the repellents. Such methods are found in many patents including U.S. Pat. No. 3,462,296. Application of similar repellents from organic solutions is also well known and is disclosed in U.S. Pat. No. 3,533,977. Application of such repellents in the form of aerosols is disclosed in U.S. Pat. No. 3,459,696. Aqueous dispersions of fluorinated water repellents can be prepared and shipped with active ingredient concentration of 15 to 25 percent and in some cases as high as 50 percent. Available organic solutions of the fluorinated materials generally contain only 5 to 10 percent of active ingredient dissolved in halogenated solvents. While organic solutions can be easily applied to textiles in machines designed to handle organic solvent compositions, it has been a goal in the art to develop a method for using the aqueous dispersions in conjunction with solvents in the solvent-handling machines.

The problem is essentially one of emulsion stability, and a number of methods have been proposed for solving it. U.S. Pat. No. 3,657,173 discloses compositions incorporating an alcohol of low molecular weight as a means of stabilizing an emulsion of aqueous fluorinated oil and water repellent in chlorinated solvent; U.S. Pat. No. 3,535,156 discloses the use of a lower alcohol plus a $C_1-C_4$ alkyl ether of a $C_2-C_4$ ethylene glycol as a means of maintaining the emulsion; and U.S. Pat. No. 3,540,924 discloses emulsions which incorporate acetone and glycol.

The disclosed methods are not satisfactory for various reasons, but a drawback they share is the required use of inactive ingredients such as emulsification aids which do nothing to aid in the application of the fluorinated material, nor to aid in the effect of treatment.

The compositions of this invention employ a polymer as emulsion stabilizer, and the polymer improves the performance of the treatment on the substrate.

SUMMARY

In summary, this invention is directed to a composition consisting essentially of
- from about 50 to 99.9 percent of an aliphatic hydrocarbon or halogenated hydrocarbon solvent,
- from about 0.02 to 30 percent of water,
- from about 0.01 to 15 percent of polyfluoroalkyl-containing stain repellent, and
- from about 0.002 to 3 percent of a copolymer of 80 to 20 mol percent ethylene and 20 to 80 mol percent of an aminoalkyl acrylate of the formula

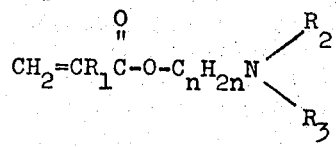

wherein
$R_1$ is hydrogen or methyl,
$R_2$ is hydrogen or alkyl of 1 to 4 carbons,
$R_3$ is hydrogen or alkyl of 1 to 4 carbons, and
$n$ is a positive integer of from 1 through 4.

The indicated percent is based on the weight of the composition.

DESCRIPTION OF INVENTION

When existing water based emulsions of polyfluoroalkyl containing water and oil repellent products are vigorously agitated in a textile cleaning solvent such as trichloroethylene or perchloroethylene, an emulsion results, but when agitation ceases the emulsion breaks and the components separate. The prior art discloses adjuvants, usually cosolvents such as alcohols or glycols, for aiding the maintenance of the emulsified form, but such adjuvants do not assist the function of the repellents on substrates or may be objectionable for other reasons such as flammability. In the present invention a copolymer of ethylene and an aminoalkyl acrylate or methacrylate is dissolved in the solvent and a typical water based polyfluoroalkyl containing oil and water repellent is stirred in vigorously. The resulting emulsion concentrate is quite stable, and when it does separate can be easily restored by simple stirring or shaking. For application to textile substrates, the water in oil emulsion product is greatly diluted with additional solvent and applied to textile fabrics therefrom. This diluted composition is also included within the scope of the present invention.

Oil and water repellent agents suitable for use in the compositions of this invention are exemplified by polyfluoroalkyl substituted compounds which contain perfluorinated alkyl chains of at least three and as many as sixteen carbons. Representative agents are polymers of fluoro monomers which may be copolymerized or "extended" with non-fluorinated monomers, and are listed below:

1. 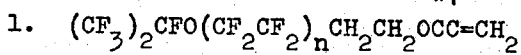

where
$n$ may be 1 to 5; and
R is H or $CH_3$. These compounds are disclosed in U.S. Pat. No. 3,547,861.

2. 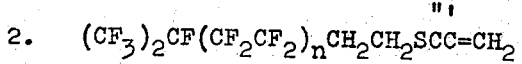

where
$n$ is usually 3 but may be from 1 to 5; and
R is H or $CH_3$. These compounds are disclosed in U.S. Pat. No. 3,544,663.

3. 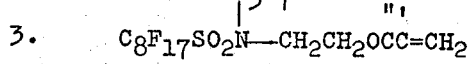

where

R is H or $CH_3$ is disclosed in U.S. Pat. No. 2,803,615. Useful polymers of such monomers are also disclosed in U.S. Pat. Nos. 3,068,187 and 3,574,791.

4. 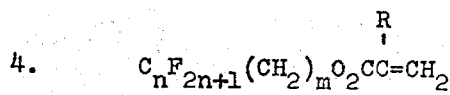

where
n has a value of 3 to 14; m is an integer of from 1 to about 12; and R is H or $CH_3$ are disclosed in U.S. Pat. Nos. 2,642,416; 3,102,103; 3,378,609; 3,392,046 and 3,546,187.

5. 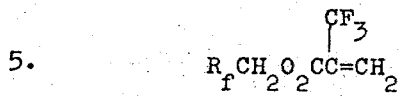

where
$R_f$ is a perfluorinated alkyl group of 3 to 17 carbons, disclosed in U.S. Pat. Nos. 3,386,977 and 3,395,174.

6. 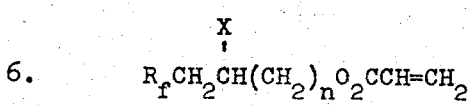

where
n is ≥ 1;
X is $-O_2C-$ alkyl, $-(CH_2)_mOH$, $-(CH_2)_mO_2C$-alkyl, or OH
wherein
m is an integer of from 0 to 10; and $R_f$ is perfluoroalkyl of from 3 to 21 carbons as disclosed in U.S. Pat. No. 3,575,940; U.S. Pat. No. 3,514,420; Japanese Patents 23923/67, 26607/68; 1994/69 and 2182/70.

7. 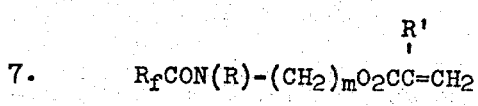

where
$R_f$ is perfluoroalkyl of 4 to 18 carbons;
m is an integer of 2 to 6;
R is an alkyl group of 4 to 10 carbons; and
R' is H or methyl as disclosed in U.S. Pat. No. 3,304,278.

8. 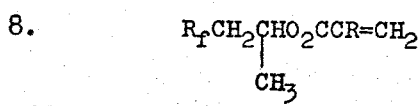

where
$R_f$ is perfluoroalkyl of 5 to 12 carbons; and
R is H or methyl as disclosed in U.S. Pat. No. 3,384,627.

The above list is intended to be merely exemplary of the suitable fluorine containing monomers employed in some commercial oil and water repellent polymers for textile finishing. The polymers are available in the form of aqueous emulsions containing from 5 to 50 percent active ingredient (polymer).

The preferred polyfluoroalkyl containing copolymers are disclosed in Example 1 of U.S. Pat. No. 3,462,296 and in Example 1, Part C of U.S. Pat. No. 3,546,187. The first is formed by copolymerizing a monomer mixture containing 0.5 part 2-hydroxyethyl methacrylate, 0.5 part N-methylolacrylamide, 50 parts 2-ethylhexyl methacrylate and 150 parts $F(CF_2)_nCH_2CH_2O_2CC(CH_3)=CH_2$ where n is 6, 8 and 10 in the weight ratio 3:2:1 with less than 10 percent by weight of n=12 and 14. The second is formed by copolymerizing a monomer mixture containing 0.095 part 2-hydroxyethyl methacrylate, 0.087 part of N-methylolacrylamide, 16 parts of trifluoroethyl vinyl ether and 144 parts of $F(CF_2)_nCH_2CH_2O_2CCH=CH_2$ where n represents the numerals 6, 8, 10, 12 and 14 in the approximate weight ratio 35/30/18/8/3.

Copolymers of ethylene and aminoalkyl acrylates useful for preparing the compositions of the present invention are prepared from 80–20 percent ethylene and 20–80 percent by weight of an aminoalkyl acrylate monomer having the formula

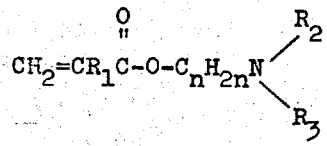

wherein
$R_1$ is hydrogen or methyl;
$R_2$ is hydrogen or alkyl of 1 to 4 carbon atoms;
$R_3$ is hydrogen or alkyl of 1 to 4 carbon atoms; and
n is a positive integer of from 1 through 4.

Polymers containing less than about 20 percent of the basic function bearing unit do not provide adequate emulsion stabilizing properties. Among the useful acrylate monomers there may be mentioned 2-(dimethylamino)ethyl acrylate and methacrylate, aminoethyl acrylate and methacrylate, 2-(diethylamino)ethyl acrylate and methacrylate, 2-(methylamino)ethyl acrylate and methacrylate, 2-(t-butylamino)ethyl acrylate and methacrylate and 3-(dimethylamino)propyl acrylate and methacrylate. The preferred polymer contains 70 percent units derived from ethylene and 30 percent units derived from 2-(dimethylamino)-ethyl methacrylate.

The copolymers can be prepared as disclosed by Hammer in Canadian Patent 900,650. The copolymers are characterized by a melt index of between 1 and 3,000. They are readily soluble when heated in hydrocarbon or chlorinated hydrocarbon solvents in the amounts contemplated for the compositions of the invention. Textile fabrics treated with the compositions of the invention and cured in the usual manner exhibit water and oil repellency as good and, in some instances, better than when the same amount of repellent is applied by conventional aqueous methods.

Suitable solvents are those commonly employed as textile cleaning solvents in dry cleaning applications and as scouring agents in textile processing operations. Included are trichloroethylene, perchloroethylene, methyl chloroform and Stoddard solvent. Other solvents such as carbon tetrachloride, kerosene and other hydrocarbons can function satisfactorily to produce compositions of the invention, but may have objectionable features so far as their application is concerned. The preferred solvent is perchloroethylene.

The compositions of this invention can contain from about 0.01 to 15 percent of polyfluoroalkyl-containing repellent, about 0.002 to 3 percent ethylene-aminoalkyl acrylate copolymer, about 0.02 to 30 percent water and about 99.9 to 50 percent solvent. Preferably the emulsion concentrate will contain 63–79 percent solvent, 15–25 percent water, 5–10 percent polyfluoroalkyl-containing repellent and 1–2 percent ethylene-aminoalkyl acrylate copolymer.

Alternative methods can be used for preparation of a diluted form of the fluoropolymer emulsion of the invention. A convenient method employs addition of a solution of the ethylene-aminoalkyl acrylate copolymer in trichloroethylene to an aqueous mixture of fluoroalkyl monomers before polymerization is carried out. The polymerization can be performed in the usual manner; the resulting product containing the usual fluoropolymer plus the ethylene-amino acrylate copolymer in an aqueous emulsion containing a small amount of trichloroethylene solvent. This aqueous based composition readily disperses in large amounts of trichloroethylene or perchloroethylene to form a water in oil emulsion composition of the invention.

In its diluted form the composition will preferably contain from about 0.01 to 0.5 percent of polyfluoroalkyl repellent and correspondingly from about 0.002 to 0.1 percent of the ethylene-aminoalkyl acrylate copolymer. The amount of water will normally be that originally present in the aqueous dispersion of polyfluoroalkyl repellent, or from about 0.02 to 2.5 percent of the diluted form of the composition. For some applications additional water can be added in small amounts. The hydrocarbon or chlorinated hydrocarbon solvent makes up the remainder of the composition.

In preparing the diluted form of the composition for treating textiles the prime consideration is the amount of polyfluoroalkyl containing repellent desired on the treated fabric, and the degree of oil and/or water repellency desired. While a discernible degree of repellency can be obtained at very low add-on of repellent, it is preferred to deposit from about 0.05 percent to about 1.0 percent of the polyfluoroalkyl containing solids, based on the dry weight of textile fabric.

Suitable substrates include not only fabrics and garments but also filaments, fibers, yarns and other articles formed of natural, modified natural, or synthetic polymeric materials or from blends of these and other fibrous materials. Paper, leather and other materials can also be treated. Specific examples are cotton, silk, regenerated cellulose, nylon, fiber-forming linear polyesters, fiber-forming polyacrylonitrile, cellulose nitrate, cellulose acetate, and ethyl cellulose. Dyed and undyed cotton sateen, poplin, broad-cloth, jean cloth and gabardine are especially adaptable for treatment with the compositions of this invention to provide products having a high repellency to oil and water, being relatively unaffected by the action of heat, air and light.

The composition can be applied by brushing, dipping, spraying, padding, roll-coating or by any combination of these methods. For example, the prepared polymer composition can be used as a pad bath. The textile material is padded in this bath, and is then freed of excess liquid, usually by squeeze rolls, so that the dry pick-up (weight of the dry polymer on fiber) is between 0.05 and 1.0 percent by weight of the fiber. The treated material is then heated suitably at 150°C. to 195°C. for at least 15 seconds to impart maximum durability of the agent on the material. The resulting textile material will be found to be resistant to water and/or oil.

The compositions can also be employed during a normal drycleaning operation. The temperature of the drying step, or of a subsequent heating step, should normally be from 61°C. to 71°C. for periods up to 30 minutes, although lower or higher temperatures can often be used depending on the material being treated.

When used during drycleaning operations, a prepared concentrate which is an emulsion containing solvent, water, polyfluoroalkyl repellent and emulsion stabilizing copolymer can be introduced to the drycleaning solvent in the dry-cleaning machine; or, alternatively, a dilute form of the composition can be prepared in situ in the drycleaning equipment. In the latter instance the emulsion-stabilizing copolymer is introduced into the drycleaning solvent and dissolved therein by circulating said solvent, and subsequently the aqueous dispersion of polyfluoroalkyl repellent is introduced and dispersed by the agitation and circulation of the solvent in the machine. The fabric to be cleaned and treated is then introduced. The dry cleaning detergent ordinarily employed in dry cleaning operation is omitted.

In either instance the drycleaning cycle is carried out with one slight change. Filtration of the circulating solvent is omitted during the time the textile material is in contact with the repellent-laden fluid. In this way the possibility of filtering out the repellent is avoided. The remainder of the drycleaning cycle is carried out in the usual manner. Because drycleaning machines do not normally achieve the temperature necessary to properly cure most polyfluoroalkyl repellents, this type of application is not as efficient as when the repellents are cured on the treated fabric at 150°–200°C.

An advantage of this invention lies in its use of aqueous emulsions of oil and water repellent compositions in coemulsion with drycleaning type solvents. The aqueous emulsions, sold commercially with about 15 percent content of polymeric solids, can be used in dry cleaning and other solvent treatment machines in place of currently sold solvent solutions which contain only 5 to 10 percent of the polymeric solids. Stable emulsions can be prepared, as disclosed herein, which contain solvent, water, adjuvant and more than 10 percent polymeric oil and water repellent agents.

The following examples further illustrate the present invention. Parts and percentages are by weight unless otherwise indicated. The treated fabric samples were tested for water repellency using A.A.T.C.C. Standard Test Method 22–1952 of the American Association of Textile Chemists and Colorists (ASTM–D–583–63). A rating of 100 denotes no water penetration or surface adhesion, a rating of 90 denotes slight random sticking or wetting and so on.

The samples were tested for oil repellency using A.A.T.C.C. Standard Test Method 118–1966. In the tests reported herein, clear, undyed oil was used and gradings made 30 seconds after application of oil to treated cloth.

Oil repellency results run from 0–6; 6 being good repellency, 0 being poor.

EXAMPLE 1

Into a suitable vessel were charged 34.5 parts of trichloroethylene, which was heated to 60°C. At 60°C. there was added 0.5 part of a copolymer prepared from 70 parts ethylene and 30 parts 2-(dimethylamino)ethyl methacrylate. The charge was stirred at 60°–65°C. until dissolution was complete, about one hour. The charge was cooled while adding, in a slow, steady stream, 15.0 parts of an aqueous dispersion containing 24 percent by weight of a copolymer prepared as in Example 1 of U.S. Pat. No. 3,462,296. The copolymer contained units derived from a monomer mix containing 75.0 parts $F(CF_2)_nCH_2CH_2O_2CC(CH_3)=CH_2$ where $n$ is 6, 8, and 10 in the weight ratio of 3:2:1 with less than 10 percent by weight of $n=12$ and 14, 25 parts 2-ethylhexyl methacrylate, 0.25 part 2-hydroxyethyl methacrylate and 0.25 part N-methylolacrylamide. After all of the copolymer dispersion had been added, agitation was continued for about an hour. The charge was then circulated through a homogenizer incorporating a high shear agitator. The emulsified product was then ready for dilution and application as an oil and water repellent coating on textile fabric.

When applied to polyester double knit fabric from a trichloroethylene pad bath and cured by heating at 165°C. for 2 minutes, leaving 0.144 percent (based on fiber weight) of fluororepellent on the fabric, oil repellency rating was 6 and water repellency was 90.

EXAMPLE 2

A. A composition was prepared by first dissolving 2 pounds of the copolymer derived from 70 percent ethylene and 30 percent dimethylaminoethyl methacrylate in 278 pounds of trichloroethylene, then mixing in, with rapid agitation, 120 pounds of an aqueous dispersion containing 24 percent of a copolymer prepared by polymerizing a mixture of monomers containing 90 parts $F(CF_2)_nCH_2CH_2O_2CCH=CH_2$ where $n$ is 3 to 14, 10 parts of trifluoroethyl vinyl ether, 0.25 part N-methylolacrylamide and 0.25 part of 2-hydroxyethyl methacrylate, as disclosed in Example 1, Part C of U.S. Pat. No. 3,546,187. A stable emulsion resulted.

B. The above prepared composition was used to treat textile fabric as follows:

A charge of 70 pounds of 65 percent cotton/35 percent polyester clothing was scoured at ambient temperature with about 70 gallons of perchloroethylene. The fabric was first washed in a basket washer for about 5 minutes while particulate soil was removed by filtering the circulating solvent. Then 1.4 pounds of the emulsified product described above were added to the perchloroethylene along with 2 pounds of water to aid in removal of water soluble soil. The fabric was then washed an additional 5 minutes while by-passing the solvent filter. After 1 to 2 minutes of centrifugal extraction the fabric was dried at 71°–77°C. The treated clothes exhibited good water repellency.

The stable emulsion composition of Part A was diluted with trichloroethylene and applied to polyester double knit fabric from a pad bath and wrung out, then heated at 165°C. for 2 minutes to dry and cure. With an application level leaving 0.192 percent of fluororepellent on the dry fabric, the oil repellency rating was 7 and the water repellency rating was 100.

EXAMPLES 3–6

A stock solution was prepared by dissolving 5 parts of the copolymer prepared from 70 parts ethylene and 30 parts 2-(dimethylamino)ethyl methacrylate in 95 parts of trichloroethylene at 60°C. In each example, 40 parts of the stock solution were mixed with 40 parts of trichloroethylene, then the aqueous fluoropolymer dispersion was added slowly with moderate stirring. Each of the mixtures was then homogenized in a high shear mixer to form a stable emulsion. Each emulsion was successfully extended by stirring into a large amount of trichloroethylene to form a pad bath suitable for applying the product to fabric.

EXAMPLE 3

Twenty parts of a commercial aqueous fluoropolymer latex containing 30 percent active ingredient were employed. The polymer was that disclosed in U.S. Pat. No. 3,068,187 formed from a 50/50 weight ratio of

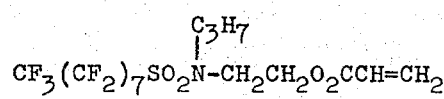

and

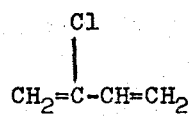

The final trichloroethylene emulsion was stable and suitable for use in treating fabrics.

EXAMPLE 4

A two part commercial fluororepellent, "Scotchguard" FC214A and FC214B, was employed. Ten parts of the A product and 10 parts of the B product were dispersed in the trichloroethylene solution as described. The exact composition is not known, however it is believed that Part A utilizes a copolymer very closely resembling that employed in Example 3, while Part B employs polyfluorourethane based on an aromatic isocyanate. Compounds of this type are disclosed in U.S. Pat. No. 3,398,182 assigned to Minnesota Mining and Mfg. Co. The emulsion resulting from mixing the "Scotchguard" 214A and 214B in the trichloroethylene solution was stable and suitable for use in treating textile fabric.

EXAMPLE 5

Twenty parts of a paste containing 40 percent fluororepellent solids ("Scotchguard" FC-218) were emulsified in the trichloroethylene as described above. The product is disclosed in U.S. Pat. No. 3,574,791 and is believed to contain as major component a polymer of the type illustrated by the following formula

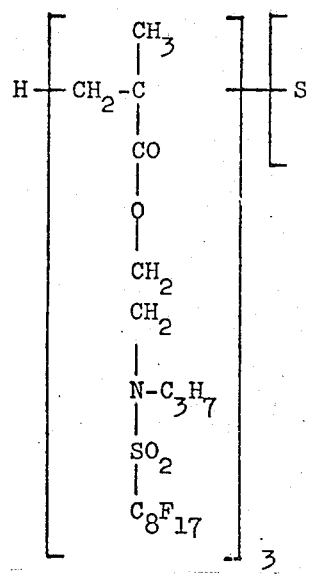 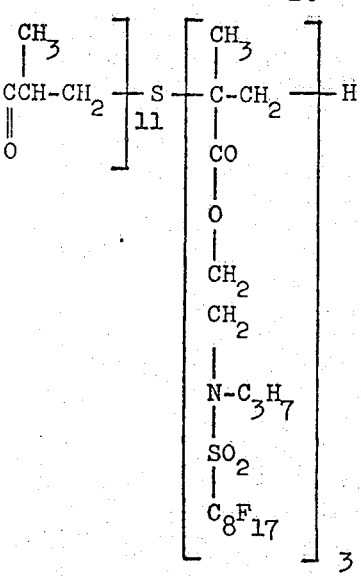

The paste product emulsified smoothly in the trichloroethylene solution to form a stable emulsion suitable for treating textile fabrics.

EXAMPLE 6

The polyfluororepellent used in this example was an aqueous dispersion containing 11.4 percent of a product obtained by heating 140 parts of $R_fCH_2CH_2OH$ where $R_f$ is $F(CF_2CF_2)_n$ and n is 2 to 7, the average molecular weight being about 470, 60 parts of $HO(CH_2CH_2O)_{22}H$ and 28.7 parts of hexa(methoxymethyl)melamine with 0.15 part of p-toluenesulfonic acid monohydrate. When essentially all of the methanol of reaction was distilled off and the mass became viscous, a little ammonium hydroxide was added to neutralize the acidity present. The mass was diluted with a small amount of isopropyl alcohol, then dispersed in water to 11.4 percent solids. Twenty parts of this product were emulsified in the trichloroethylene solution to give a stable emulsion suitable for treating textile fabrics.

The trichloroethylene emulsions prepared in Examples 3, 4, 5 and 6 were applied to polyester double knit fabric from trichloroethylene pad baths. Pickup was adjusted to leave 1 percent of the prepared emulsion on the fabric in each test, based on dry fabric weight. The fabric was dried, then cured for about 90 seconds at 165°C. Results of oil and water repellency tests on the treated fabrics are shown in Table I below.

TABLE I

| Product of Example | Dry Fluororepellent Wt. on fiber, % | Water Repellency | Oil Repellency |
|---|---|---|---|
| 3 | 0.06 | 80 | 6 |
| 4 | 0.04 | 80 | 6 |
| 5 | 0.04 | 0 | 6 |
| 6 | 0.023 | 70 | 6 |

The product employed in Example 5 is not sold as a water repellent.

EXAMPLE 7

Deoxygenated water was prepared by bubbling nitrogen through 63 parts of water as the water boiled and refluxed for an hour. In another vessel were mixed 59.1 parts of the nitrogen treated water and 18.4 parts of a mixture containing 11.3 parts dimethyloctadecylamine and 7.1 parts acetic acid. To this water-amine mixture was added a pre-mixed composition containing 43.1 parts of $F(CF_2)_nCH_2CH_2O_2CC(CH_3)=CH_2$ as in Example 1, 14.4 parts of 2-ethylhexyl methacrylate and 23 parts of a solution containing 15 parts trichloroethylene and 8 parts of the same ethylene - 2-(dimethylamino)ethyl methacrylate employed in Example 1. The entire composition was stirred in a high shear mixer for 10 minutes then purged for an hour with nitrogen. In a suitable polymerization vessel there was placed 137.5 parts of the composition, and to it were added 0.12 part of 2-hydroxyethyl methacrylate, 0.18 part of a 60 percent aqueous solution of N-methylolacrylamide and 0.024 part of dodecyl mercaptan. With nitrogen bubbling through the agitated mixture held at 65°–70°C. there was added 1 part of a solution in 10 parts water of 0.2 part azobis(isobutyramidine)dihydrochloride. The charge was held at 65°–70°C. for 4 hours, an additional 1 part of azobis(isobutyramidine)dihydrochloride solution being added after 1 hour on temperature. After cooling to room temperature, the aqueous emulsion was suitable for preparing water in oil emulsion compositions of this invention by stirring it vigorously into a larger volume of a suitable cleaning solvent such as Stoddard solvent, perchloroethylene or other commercial cleaning solvent.

The aqueous based concentrate containing fluoropolymer and emulsion-stabilizing copolymer was employed in a composition of this invention as follows:

In a typical small commercial dry cleaning machine there were placed 25 pounds of a variety of soiled garments for dry cleaning and 2250 pounds of perchloroethylene. The machine was previously washed thoroughly to remove any residual detergents, which might impair the efficiency of the subsequent treatment. The cycle was started, and after about 4 to 5 minutes (½ the normal washing time) the filter was by-passed and 315 grams of the aqueous based concentrate was added.

After addition of the oil and water repellent composition, the cycle was resumed. The garments were washed in the perchloroethylene-stain repellent for about 5 minutes, then agitation was stopped. The liquid was drained away and the load spun and dried. Upon removal the garments were found to shed water poured on them very efficiently. There were no increase in wrinkling, and appearance of the garments after pressing was judged equal or superior to those treated with a normal dry-cleaning composition. Handling and recovery of the dry cleaning solvent was carried out in the routine manner. There was no additional make-up or purification required.

The embodiments of the invention in which an exclusive property or privilege is claimed are defined as follows:

1. A composition consisting essentially of
   from about 50 to 99.9 percent of an aliphatic hydrocarbon or halogenated hydrocarbon solvent,
   from about 0.02 to 30 percent of water,
   from about 0.01 to 15 percent of polyfluoroalkyl-containing stain repellent polymer, the polyfluoroalkyl having from 3 to 16 perfluorinated carbons and being a solid at ambient temperatures, and
   from about 0.002 to 3 percent of a copolymer of 80 to 20 mol percent ethylene and 20 to 80 mol percent of an aminoalkyl acrylate of the formula

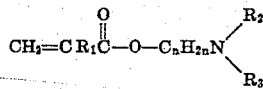

wherein
   $R_1$ is hydrogen or methyl,
   $R_2$ is hydrogen or alkyl of 1 to 4 carbons,
   $R_3$ is hydrogen or alkyl of 1 to 4 carbons, and
   $n$ is a positive integer of from 1 through 4,
   the copolymer having a melt index between 1 and 3,000 and being a solid at ambient temperatures the indicated percent being based on the weight of the composition.

2. The composition of claim 1 consisting essentially of
   63 to 79 percent solvent,
   15 to 25 percent water,
   5 to 10 percent stain repellent, and
   1 to 2 percent ethylene-acrylate copolymer.

3. The composition of claim 1 consisting essentially of
   96.9 to 99.9 percent solvent
   0.02 to 2.5 percent water
   0.01 to 0.5 percent stain repellent, and
   0.002 to 0.1 percent ethylene-acrylate copolymer.

4. The composition of claim 1 in which the ethylene-acrylate copolymer contains 70 percent units of ethylene and 30 percent units of 2-(dimethylamino)ethyl methacrylate.

5. The composition of claim 1 in which the solvent is perchloroethylene.

* * * * *